(12) United States Patent
Ramakrishna et al.

(10) Patent No.: US 12,166,544 B2
(45) Date of Patent: Dec. 10, 2024

(54) MODELING INTERFERENCE PATTERN IN A MASSIVE MULTIPLE INPUT, MULTIPLE OUTPUT (MIMO) DEPLOYMENTS

(71) Applicant: Rakuten Symphony, Inc., Tokyo (JP)

(72) Inventors: Raghavendra Madanahally Ramakrishna, Bangalore (IN); Manjari Chhawchharia, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 43 days.

(21) Appl. No.: 18/175,540

(22) Filed: Feb. 28, 2023

(65) Prior Publication Data

US 2024/0291523 A1   Aug. 29, 2024

(51) Int. Cl.
*H04B 7/04* (2017.01)
*H04B 7/0413* (2017.01)
*H04B 17/345* (2015.01)
*H04B 17/391* (2015.01)

(52) U.S. Cl.
CPC ........ *H04B 7/0413* (2013.01); *H04B 17/345* (2015.01); *H04B 17/391* (2015.01)

(58) Field of Classification Search
CPC ... H04B 7/0413; H04B 17/345; H04B 17/391
USPC .................................. 375/262, 267, 299, 347
See application file for complete search history.

(56) References Cited

U.S. PATENT DOCUMENTS

| | | | |
|---|---|---|---|
| 11,569,893 B1 * | 1/2023 | Kotagiri | H04B 7/0695 |
| 2022/0029670 A1 * | 1/2022 | Fakoorian | H04L 25/0224 |
| 2022/0124741 A1 * | 4/2022 | Elshafie | H04L 5/0053 |

* cited by examiner

*Primary Examiner* — Emmanuel Bayard
(74) *Attorney, Agent, or Firm* — HAUPTMAN HAM, LLP

(57) ABSTRACT

A method and Radio Access Network (RAN) Intelligent Controller (RIC) modeling interference patterns in a Massive Multiple Input, Multiple Output (MIMO) network. Information associated with beams transmitted in an Open RAN (O-RAN) is obtained. An interference matrix identifying interference patterns is generated based on the information associated with the beams transmitted in the O-RAN. One or more optimization solutions are determined based on the interference patterns identified in the interference matrix. One or more signals are sent to one or more elements in the O-RAN to implement the one or more optimization solutions.

20 Claims, 8 Drawing Sheets

MODELING INTERFERENCE PATTERN IN A MASSIVE MULTIPLE INPUT, MULTIPLE OUTPUT (MIMO) DEPLOYMENTS

TECHNICAL FIELD

This description relates to modeling interference pattern in a Massive MIMO deployment, and method of using the same.

BACKGROUND

Beamforming and Massive Multiple Input Multiple Output (MIMO) work together to deliver 5G's demanding throughput and connection densities. Massive MIMO uses multi-antenna arrays and spatial multiplexing to transmit independent and separately encoded data signals, known as "streams." These enable simultaneous communications with multiple user equipment (UE) over the same time period and frequency resource. Beamforming is used in tandem with MIMO to focus the beams more tightly towards individual UEs, enabling higher connection densities and minimizing interference between individual beams.

Massive-MIMO (M-MIMO) high gain narrow beams to be schedule for users and reduces intra-cell and inter-beam interference. Close to cell edge, users may experience high interference from beams of neighboring cells which degrades their performance.

Intercell interference (ICI) is a classical problem for mobile cellular networks. Due to the scarcity of spectrum resources, frequencies are reused among different cells. The level of ICI in cellular networks depends on various factors, such as the cell topology, frequency reuse scheme, transmission power, and multiple access techniques.

Conducting 5G communication on millimeter wave (mm-Wave) bands is more complex because of higher propagation losses and greater attenuation variance, which depend on environment change. Massive antenna arrays with beamforming techniques are usable to overcome high propagation loss, reduce interference, deliver performance gains of coordination with low overhead, and deliver high network capacity with multiplex transmitters. The central challenge of a massive antenna array that uses beamforming techniques is coordinating the users and beams for the transmitters within a large network. However, there is no method for modeling flash interference across beams in a Massive MIMO systems.

SUMMARY

In at least embodiment, a method for modeling interference patterns in a Massive Multiple Input, Multiple Output (MIMO) network includes obtaining, at a Radio Access Network (RAN) Intelligent Controller (RIC), information associated with at least two beams transmitted in an Open RAN (O-RAN), generating, at the RIC, an interference matrix identifying interference patterns based on the information associated with the at least two beams transmitted in the O-RAN, determining, by the RIC, one or more optimization solutions based on the interference patterns identified in the interference matrix, and sending, by the RIC, one or more signals to one or more elements in the O-RAN to implement the one or more optimization solutions.

In at least one embodiment, a, includes a memory storing computer-readable instructions, and a processor connected to the memory, wherein the processor is configured to execute the computer-readable instructions to obtain information based on the information associated with at least two beams transmitted in the O-RAN, generate an interference matrix identifying interference patterns associated with the at least two beams transmitted in the O-RAN, determining one or more optimization solutions based on the interference patterns identified in the interference matrix, and sending one or more signals to one or more elements in the O-RAN to implement the one or more optimization solutions.

In at least one embodiment, a non-transitory computer-readable media having computer-readable instructions stored thereon, which when executed by a processor causes the processor to perform operations including obtaining, at a Radio Access Network (RAN) Intelligent Controller (RIC), information associated with at least two beams transmitted in an Open RAN (O-RAN), generating, at the RIC, an interference matrix identifying interference patterns based on the information associated with the at least two beams transmitted in the O-RAN, determining, by the RIC, one or more optimization solutions based on the interference patterns identified in the interference matrix, and sending, by the RIC, one or more signals to one or more elements in the O-RAN to implement the one or more optimization solutions.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
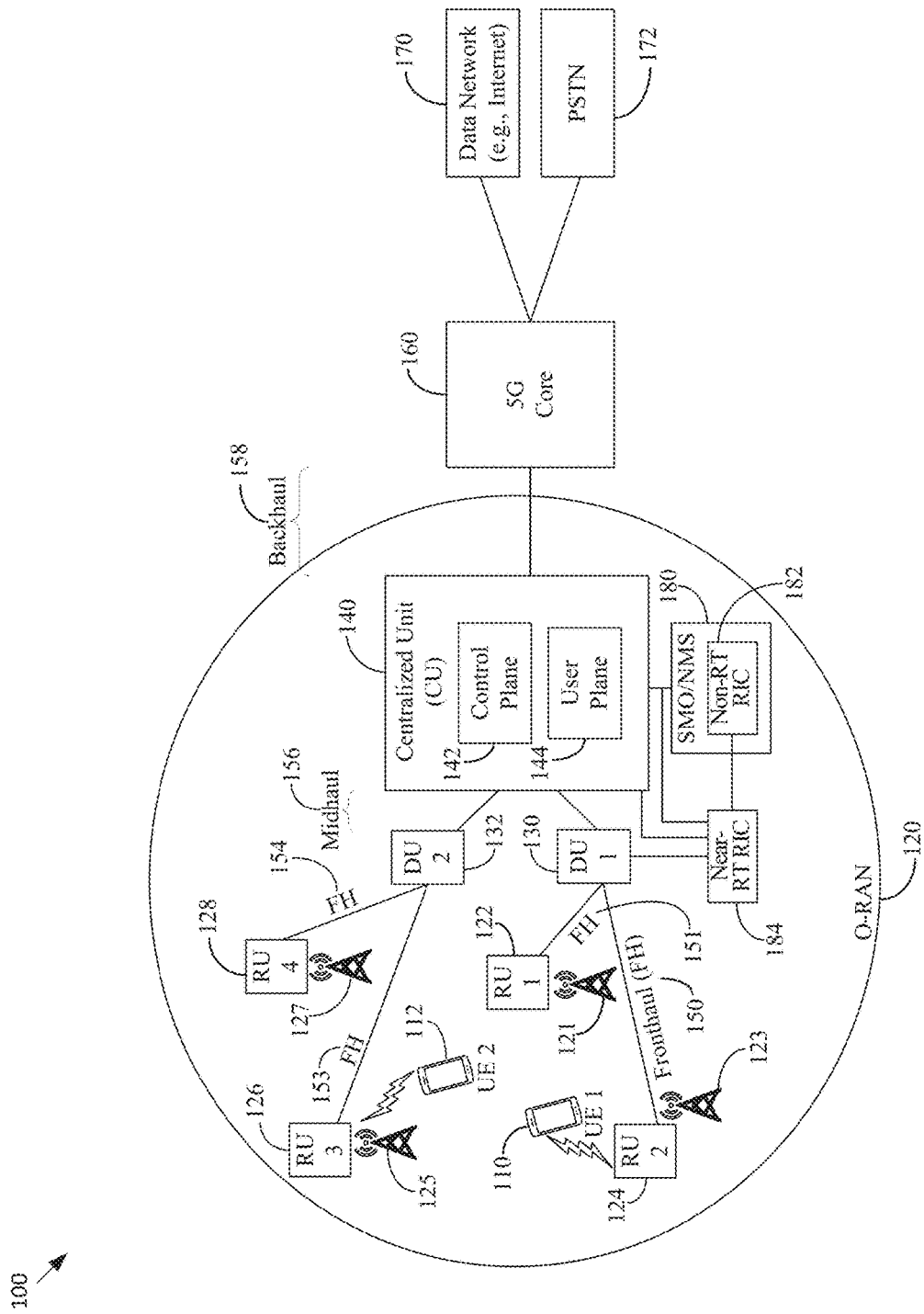
FIG. 1 illustrates a mobile network according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or data-streams or signaling-streams. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or data-streams or signaling-streams from a UE.

In at least one embodiment, a method for modeling interference patterns in a Massive Multiple Input, Multiple Output (MIMO) network includes obtaining, at a Radio Access Network (RAN) Intelligent Controller (RIC), information associated with at least two beams transmitted in an Open RAN (O-RAN), generating, at the RIC, an interference matrix identifying interference patterns associated with the at least two beams transmitted in the O-RAN, determining, by the RIC, one or more optimization solutions based on the interference patterns identified in the interference matrix, and sending, by the RIC, one or more signals to one or more elements in the O-RAN to implement the one or more optimization solutions.

Embodiments described herein provide method that provides one or more advantages. For example, the Interference Matrix enables solutions to be deployed to improve Key Performance Indicators (KPIs) of a cell, including cell-edge throughput, sector throughput etc. The Interference Matrix is also able to be used for advanced load optimization features.

FIG. 1 illustrates a mobile network 100 according to at least one embodiment.

In FIG. 1, UE 1 (User Equipment 1) 110 and UE 2 112 access Mobile Network 100 via a Radio Access Network 120.

Radio Access Network 120 includes Radio Towers 121, 123, 125, and 127. Radio Towers 121, 123, 125, 127 are associated with RU (Radio Unit) 1 122, RU 2 124, RU 3 126, and RU 4 128, respectively.

RU 1 122, RU 2 124, RU 3 126, RU 4 128 handle the Digital Front End (DFE) and the parts of the PHY layer, as well as the digital beamforming functionality. RU 1 122 and RU 2 124 are associated with Distributed Unit (DU) 1 130, and RU 3 126 and RU 4 128 are associated with DU 2 132. DU 1 130 and DU 2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data is moves across the physical network.

DU 1 130 is coupled to the RU 1 122 and RU 2 124, and DU 2 132 is coupled to RU 3 126 and RU 4 128. DU 1 130 and DU 2 132 run the RLC, MAC, and parts of the PHY layer. DU 1 130 and DU 2 132 include a subset of the eNB/gNB functions, depending on the functional split option, and operation of DU 1 130 and DU 2 132 are controlled by Centralized Unit (CU) 140. CU 140 is responsible for non-real time, higher L2 and L3. Server and relevant software for CU 140 is able to be hosted at a site or is able to be hosted in an edge cloud (datacenter or central office) depending on transport availability and the interface for the Fronthaul connections 150, 151, 153, 154. The server and relevant software of CU 140 is also able to be co-located at DU 1 130 or DU 132, or is able to be hosted in a regional cloud data center.

CU 140 handles the RRC and PDCP layers. The gNB includes CU 140 and one or more DUs, e.g., DU 1 130, connected to CU 140 via Fs-C and Fs-U interfaces for a Control Plane (CP) 142 and User Plane (UP) 144, respectively. CU 140 with multiple DUs, e.g., DU 1 130, and DU 2 132, support multiple gNBs. The split architecture enables a 5G network to utilize different distribution of protocol stacks between CU 140, and DU 1 130 and DU 2 132, depending on network design and availability of the Midhaul 156. While two connections are shown between CU 140 and DU 1 130 and DU 2 132, CU 140 is able to implement additional connections to other DUs. CU 150, in 5G. is able to implement, for example, 256 endpoints or DUs. CU 140 supports the gNB functions such as transfer of user data, mobility control, RAN sharing (MORAN), positioning, session management etc. However, one or more functions are able to be allocated to the DU. CU 140 controls the operation of DU 130 and DU 132 over the Midhaul interface 156. Backhaul 158 connects the 4G/5G Core 160 to the CU 140. Core 160 may be up to 200 km away from the CU 140. Core 160 provides access to voice and data networks, such as Internet 170 and Public Switched Telephone Network (PSTN) 172.

RAN 120 is able to implement beamforming that allow for directional transmission or reception. 5G beamforming enables 5G connections to be more focused toward a receiving device. RAN 120 is also able to MIMO (Multiple Input Multiple Output), including mMIMO (massive MIMO), to provide an increases in throughput and signal to noise ratio. MIMO improves the radio link by using the multiple paths over which signals travel from the transmitter to the receiver. The multiple paths are de-correlated and this provides the opportunity to send multiple data streams over them.

Massive MIMO and dense small cell deployments are being implemented to improve radio resource efficiency. However, the intra-cell interference from neighboring cells present a serious problem. According to at least one embodiment, the modeling of interference patterns in a Massive MIMO deployment is used to identify interfering beams between different sectors so that interference optimization techniques are able to be applied to address interference.

According to at least one embodiment, a northbound platform for the network, such as a Service Management and Orchestration (SMO)/NMS 180. SMO 180 oversees he orchestration aspects, management and automation of RAN elements. SMO 180 supports O1, A1 and O2 interfaces. Non-RT RIC (non-Real-Time RAN Intelligent Controller) 182 enables non-real-time control and optimization of RAN elements and resources, AI/ML workflow including model training and updates, and policy-based guidance of applications/features in Near-RT RIC 184. Near-RT RIC 184 enables near-real-time control and optimization of O-RAN elements and resources via fine-grained data collection and actions over the E2 interface. Near-RT RIC 184 includes interpretation and enforcement of policies from Non-RT RIC 182, and supports enrichment information to optimize control function.

Near-RT RIC 184 obtains information associated with the beams that is passed to Non-RT RIC 182 and processed, for example, by an rApp at the Non-RT RIC 184, to generate an interference matrix. xApps are hosted on the Near-RT RIC 184 and optimize radio spectrum efficiency. rApps are specialized microservices operating on the Non-RT RIC 212. xApps and rApps provide essential control and management features and functionality. The interference matrix identifies interference points in the network, such as the identification of interference between one or more beams in a first sector with one or more beams in one or more other sectors. One or more optimization solutions is determined based on the processing of the interference patterns associated with the beams in the O-RAN in the interference matrix. For example, the interference matrix is able to be processed to implement optimization solutions to improve Key Performance Indicators (KPIs) of a cell, including cell-edge throughput, sector throughput, to provide advanced load/balancing/optimization features, and to provide interference management, traffic steering, enhancement of spectral efficiency, etc. One or more signals is sent to one or more elements in the O-RAN, e.g., RUs 122, 124, 126, 128, DUs 130, 132, CU 140, etc. to implement the one or more optimization solutions.

Figure 2:
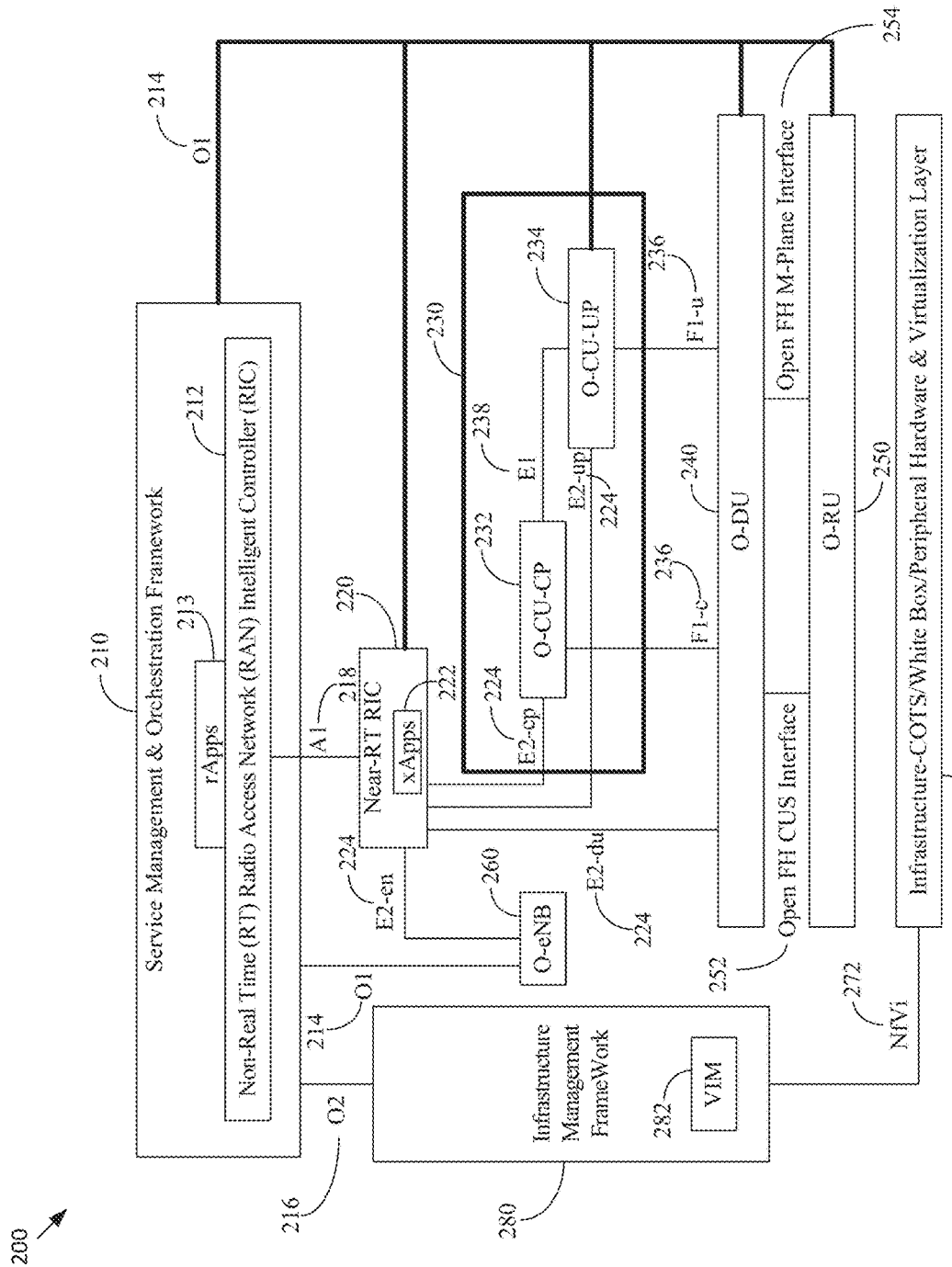
FIG. 2 is a block diagram of an Open Radio Access Network (O-RAN) according to at least one embodiment.

FIG. 2 is a block diagram of an Open Radio Access Network (O-RAN) 200 according to at least one embodiment.

In FIG. 2, Service Management and Orchestration (SMO) Framework 210 is an automation platform for Open RAN Radio Resources. SMO 210 oversees lifecycle management of network functions as well as O-Cloud. SMO 210 includes a Non-Real-Time (RT) Radio Access Network (RAN) Intelligent Controller (RIC) 212. SMO 210 also defines various SMO interfaces, such as the O1 214, O2 216, and A1 218 interfaces.

The A1 interface 218 enables communication between the Non-RT RIC 212 and a Near-RT RIC 220 and supports policy management, data transfer, and machine learning management. The A1 interface 218 is used for policy guidance. SMO 210 provides fine-grained policy guidance such as getting User-Equipment to change frequency, and other data enrichments to RAN functions over the A1 interface 218.

The O1 214 interface connects the SMO 210 to the RAN managed elements, which include the Near-RT RIC 220, O-RAN Centralized Unit (O-CU) 230, O-RAN Distributed Unit (O-DU) 240, O-RAN Radio Unit (O-RU) 250, and the Open Evolved NodeB (O-eNB) 260. The management and orchestration functions are received by the managed elements via the O1 interface 214. The SMO 210 in turn receives data from the managed elements via the O1 interface 214 for AI model training. The O1 interface 214 is further used for managing the operation and maintenance (OAM) of multi-vendor Open RAN functions including fault, configuration, accounting, performance and security management, software management, and file management capabilities.

The O2 interface 216 is used to support cloud infrastructure management and deployment operations with O-Cloud infrastructure that hosts the Open RAN functions in the network. The O2 interface 216 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 210 provides a common data collection platform for management of RAN data as well as mediation for the O1 214, O2 216, and A1 218 interfaces. Licensing, access control and AI/ML lifecycle management are supported by the SMO 210, together with legacy north-bound interfaces. SMO 210 also supports existing OSS functions, such as service orchestration, inventory, topology and policy control.

The Non-RT RIC 212 enables non-real-time (>1 second) control of RAN elements and their resources through cloud-native microservice-based applications, which are referred to as rApps 213. Non-RT RIC 212 communicates with applications called xApps 222 running on a Near-RT RIC 212 to provide policy-based guidance for edge control of RAN elements and their resources. The Non-RT RIC 212 provides non-real-time control and optimization of RAN elements and resources, AI/ML workflow, including model training and updates, and policy-based guidance of applications/features in near-RT RIC 220.

Near-RT RIC 220 controls RAN infrastructure at the cloud edge. Near-RT RIC 220 controls RAN elements and their resources with optimization actions that typically take 10 milliseconds to one second to complete. The Near-RT RIC 220 receives policy guidance from the Non-RT RIC 212 and provides policy feedback to the Non-RT RIC 212 through the xApps 222.

The xApps 222 are used to enhance the RAN's spectrum efficiency. The Near-RT RIC 220 manages a distributed collection of "southbound" RAN functions, and also provides "northbound" interfaces for operators: the O1 214 and A1 218 interfaces to the Non-RT RIC 212 for the management and optimization of the RAN. The Near-RT RIC 220 is thus able to self-optimize across different RAN types, like macros, Massive MIMO and small cells, maximizing network resource utilization for 5G network scaling.

Within the Near-RT RIC 220, the xApps 222 communicate via defined interface channels. An internal messaging infrastructure provides the framework to handle conflict mitigation, subscription management, app lifecycle management functions, and security. Data transfers are implemented via the E2 interface.

The O-RAN is split into a Central Unit (CU) 230, a Distributed Unit (DU) 240, and a Radio Unit (RU) 250. The CU 230 is further split into two logical components, one for the Control Plane (CP) 232, and one for the User Plane (UP) 234. The logical split of the CU 230 into the CP 232 and UP 234 allows different functionalities to be deployed at different locations of the network, as well as on different hardware platforms. For example, CUs 230 and DUs 240 can be virtualized on white box servers at the edge, while the RUs 250 are implemented on Field Programmable Gate Arrays (FPGAs) and Application-specific Integrated Circuits (ASICs) boards and deployed close to RF antennas.

The O-RAN Distributed Unit (O-DU) 240 is an edge server that includes baseband processing and radio frequency (RF) functions. The O-DU 240 hosts radio link control (RLC), MAC, and a physical layer with network function virtualization or containers. O-DU 240 supports one or more cells, and the O-DUs are able to support one or more beams to provide the operating support for O-RU 250 by CUS Control, User, and Synchronization) planes 252, and management (M) planes 254 through front-haul interfaces.

The O-RU 250 processes radio frequencies received by the physical layer of the network. The processed radio frequencies are sent to the O-DU 240 through fronthaul interfaces 252, 254. The O-RU 250 hosts the lower PHY Layer Baseband Processing and RF Front End (RF FE), and is designed to support multiple 3GPP split options.

An Open-Evolved Node B (O-eNB) 260 provides the hardware aspect of the O-RAN. The management and orchestration functions are received by the managed elements via the O1 interface 214. The SMO 210 in turn receives data from the managed elements via the O1 interface 214 for AI model training. The O-eNB 260 communicates with the Near-RT RIC 220 via the E2 interface 224. E2 224 enables near-real-time loops through the streaming of telemetry from the RAN and the feedback with control from the Near-RT RIC 220. The E2 interface 224 connects the Near-RT RIC 220 with an E2 node, such as the O-CU-CP 232, O-CU-UP 234, the O-DU 240, and the O-eNB 260. An E2 node is connected to one Near-RT RIC 220, while a Near-RT RIC is able to be connected to multiple E2 nodes. The protocols over the E2 interface 224 are based on the control plane and supports services and functions of Near-RT RIC 220.

An F1 Interface 236 connects the O-CU-CP 232 and the O-CU-UP 234 to the O-DU 240. Thus, the F1 interface 236 is broken into control and user plane subtypes and exchanges data about the frequency resource sharing and other network statuses. One O-CU 230 can communicate with multiple O-DUs 240 via F1 interfaces 236.

An E1 238 interface connects the O-CU-CP 232 and the O-CU-UP 234. The E1 Interface 238 is used to transfer configuration data and capacity information between the O-CU-CP 232 and the O-CU-UP 234. The configuration data ensures the O-CU-CP 232 and the O-CU-UP 234 are able to interoperate. The capacity information is sent from the O-CU-UP 234 to the O-CU-CP 232 and includes the status of the O-CU-UP 234.

The O-DU 240 communicates with the O-RU 250 via an Open Fronthaul (FH) Control, User, and Synchronization (CUS) Plane Interface 252 and an M-Plane (Management Plane) Interface 254. As part of the CUS Plane Interface 252, the C-Plane (control plane) is a frame format that carries data in real-time control messages between the O-DU 240 and O-RU 250 for use to control user data scheduling, beamforming weight selection, numerology selection, etc. Control messages are sent separately for downlink (DL)-related commands and uplink (UL)-related commands.

The U-Plane carries the user data messages between the O-DU 240 and O-RU 250, such as the in-phase and quadrature-phase (IQ) sample sequence of the orthogonal frequency division multiplexing (OFDM) signal. The S-plane includes synchronization messages used for timing synchronization between O-DU 240 and O-RU 250. The Control and User Plane are also used to send information specifying beamforming weights from the O-DU 240 to O-RU 250. Other information includes time resource and frequency resource information.

The M-Plane 254 connects the O-RU 250 to the O-DU 240, and optionally connects the O-RU 250 to the SMO 210.

The O-DU 240 uses the M-Plane 254 to manage the O-RU 250, while the SMO 210 is able to provide FCAPS services to the O-RU 250. The M-plane 254 supports the management features including startup installation, software management, configuration management, performance management, fault management and file management.

The M-Plane 254 is used by the O-DU 240 to retrieve the capabilities of the O-RU 250 and to send relevant configuration related to the C-Plane and U-Plane (data plane) to the O-RU 250. Together the O1 214 and Open-Fronthaul M-plane 254 interfaces provide a FCAPS (Fault, Configuration, Accounting, Performance, Security) interface with configuration, reconfiguration, registration, security, performance, monitoring aspects exchange with individual nodes, such as O-CU-CP 232, O-CU-UP 234, O-DU 240, and O-RU 250, as well as Non-RT RIC 220.

According to at least one embodiment, Near-RT RIC 220 obtains information associated with the beams that is passed to Non-RT RIC 212 and processed, for example, by rApps 213 to generate an interference matrix. The interference matrix identifies interference points in the network, such as the identification of interference between one or more beams in a first sector with one or more beams in one or more other sectors.

One or more optimization solutions is determined based on the processing of the interference patterns associated with the beams in the O-RAN in the interference matrix. For example, the interference matrix is able to be processed to implement optimization solutions to improve KPIs of a cell, including cell-edge throughput, sector throughput, to provide advanced load/balancing/optimization features, and to provide interference management, traffic steering, enhancement of spectral efficiency, etc. One or more signals is sent to one or more elements in the O-RAN, e.g., CU 230, DUs 240, RUs 250, etc. to implement the one or more optimization solutions.

Infrastructure-COTS/White Box/Peripheral Hardware & Virtualization Layer 270 connects to Infrastructure Management Framework 280 via Network Function Virtualization Interface (NFVI) 272. Virtualized Infrastructure Manager (VIM) 282 at Infrastructure Management Framework 280 controls and manages virtual network functions.

Figure 3:
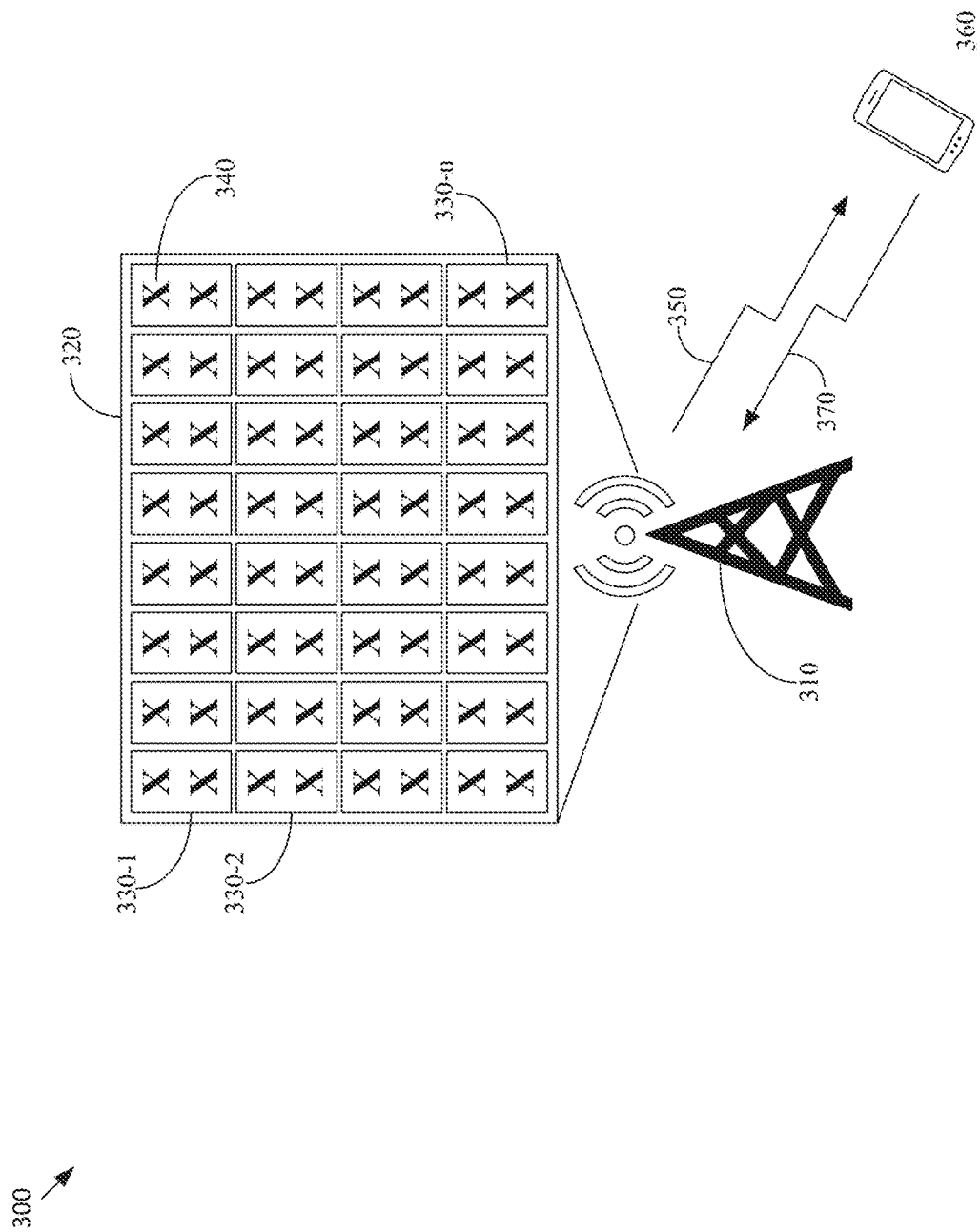
FIG. 3 illustrates a wireless communication system according to at least one embodiment.

FIG. 3 illustrates a wireless communication system 300 according to at least one embodiment.

In FIG. 3, the system 300 includes a transmit radio node 310, shown in the form of a base station, that performs transmissions via a multi-panel antenna array 320. The antenna array 320 is structured into multiple panels 330-1, 330-2, ..., 330-$n$. Multiple panels 330-1, 330-2, ..., 330-$n$ are collectively referred to here as panels 330. Panels 330 are able to be spatially arranged in a spatial dimension (e.g., stacked vertically or aligned horizontally) or multiple spatial dimensions. Panel 330 have one or more antenna elements 340 arranged in one or more spatial dimensions. Antenna panels 330 include multiple antenna elements. Panel information includes the tilt of the panel, or a number of elements in the horizontal domain or vertical domain.

The transmit radio node 310 may perform a transmission 350 via the array 330 by feeding one or more signals of the transmission 350 to one or more antenna elements of the array 330, respectively. The radio node 310 in some embodiments independently controls the amplitude and/or phase of the signals fed to the antenna elements 340 of antenna array 320, as part of precoding the transmission 350 from the antenna array 320. In such an embodiment, radio node 310 applies a precoder (e.g., a precoding matrix) to the transmission 350. The radio node 310 may select the precoder to which to apply to the transmission 350 based on a recommendation that the wireless device 360 feeds back to the radio node 310 via signaling 370. Notably, some embodiments herein tailor the precoding of radio node 310 and/or the precoder recommendation of the wireless device 360 to the structural properties of the particular multi-panel antenna array 320 via which the precoded transmission is transmitted, e.g., in terms of how the array 320 is structured into multiple panels 330.

Figure 4:
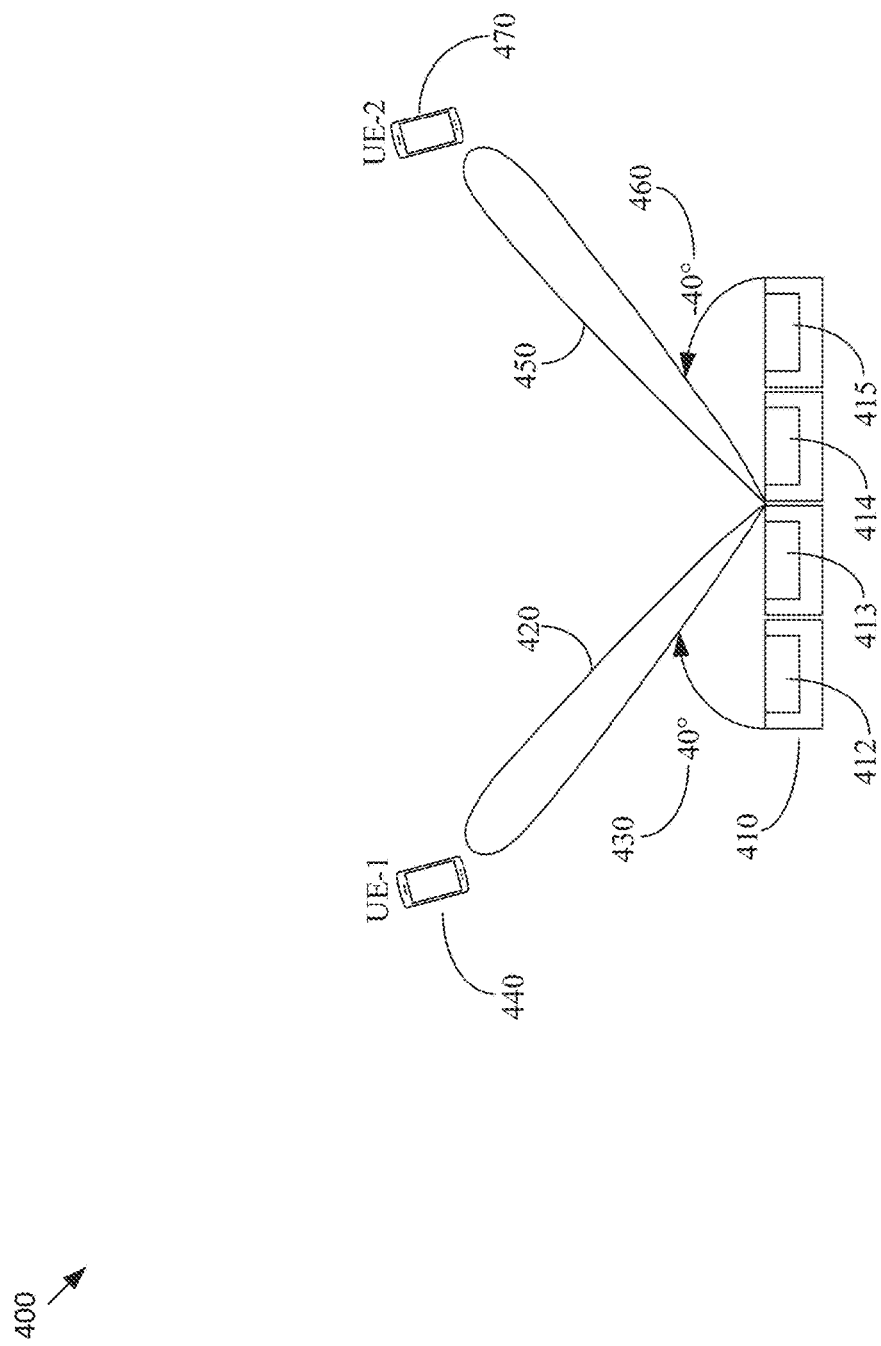
FIG. 4 illustrates beamforming according to at least one embodiment.

FIG. 4 illustrates beamforming 400 according to at least one embodiment.

In FIG. 4, beamforming 400 is implemented using a 4-element panel antenna system 410 wherein a first beam 420 that is radiated using signaling that provides a 40° phase shift 430. The first beam 420 may be steered to track User Equipment-1 (UE-1) 440 as User Device 440 moves, for example, from left to right. A second beam 450 is able to be implemented using signaling that provides a −40° phase shift 460 that is focused on UE-2 470.

Beamforming 400 is used with phased array antennae system 410 to focus the wireless signal in a chosen direction, normally towards a specific receiving device, e.g., UE-1 or UE-2 470. This results in an improved signal at UE-1 440 and UE-2 470, and also less interference between the signals of individual UE-1 440 and UE-2 470.

4 element panel antenna system 410 is a phased antenna array that is designed so that the radiation patterns from individual element combine constructively, with those from neighboring elements forming an effective radiation pattern for the main lobe or beam 420, 450, which transmits energy in the selected direction. At the same time, 4 element panel antenna system 410 is designed so that signals sent in undesired directions destructively interfere to form nulls and side lobes.

The overall 4 element panel antenna system 410 is designed to maximize the energy radiated in the beam 420, 250, while limiting the energy in the side lobes to an acceptable level. The direction of the beam 420, 450 is controlled by manipulating the radio signals applied to the individual antenna elements 412, 413, 414, 415 in the 4 element panel antenna system 410. Antenna elements 412, 413, 414, 415 in 4 element panel antenna system 410 is fed with the same transmitted signal, but the phase and amplitude of the signal fed to the elements are adjusted to steer the beam 420, 450 in the selected direction.

Figure 5:
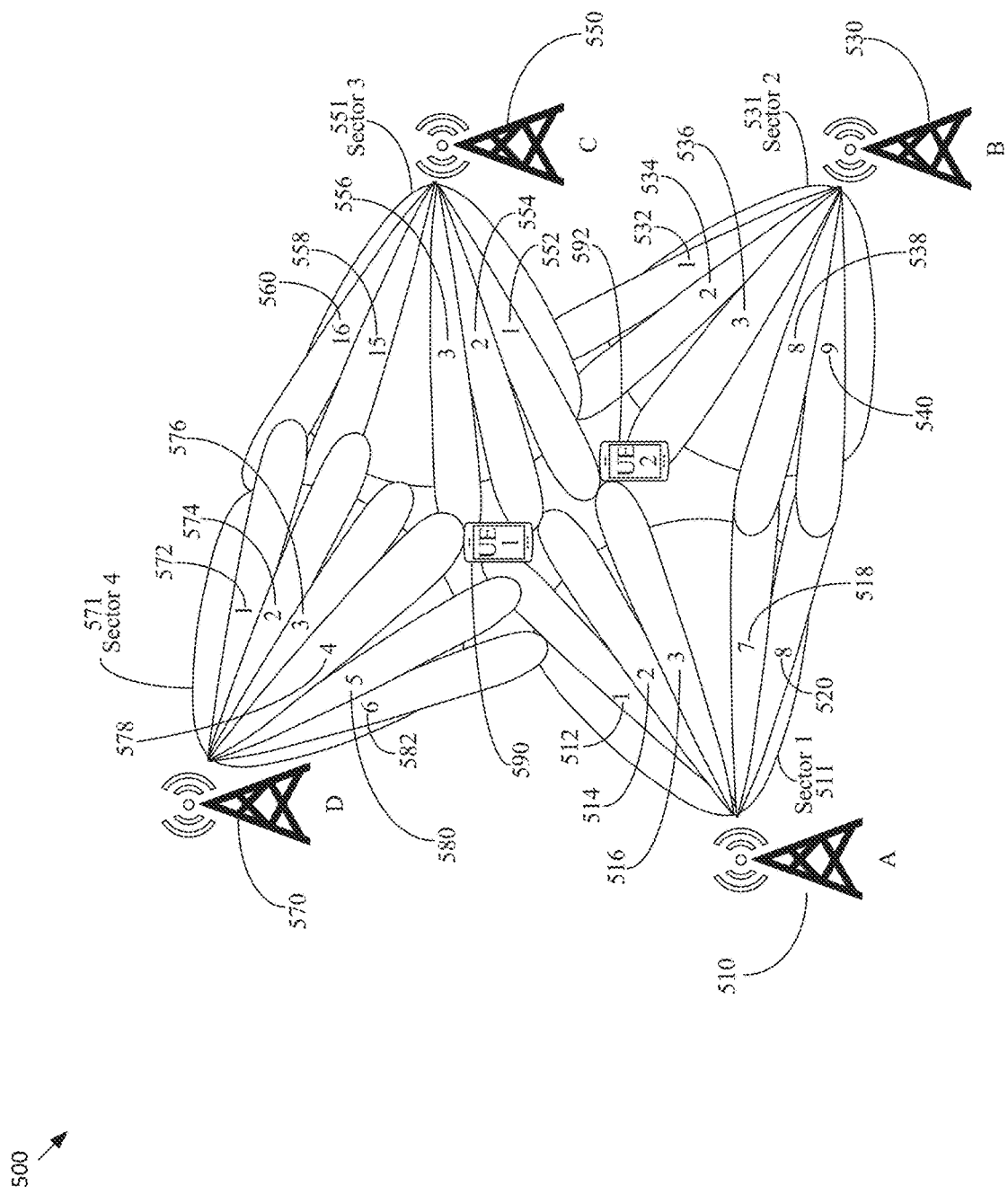
FIG. 5 illustrates interference patterns between neighboring sectors according to at least one embodiment.

FIG. 5 illustrates interference patterns 500 between neighboring sectors according to at least one embodiment.

In FIG. 5 four Radio Nodes are shown in the form of Base Stations A 510, B 530, C 550, D 570. The term "base station" refers to "Node B," "evolved Node B (eNode B)," next generation Node B (gNB), enhanced gNB (en-gNB), home Node B (HNB)," "home access point (HAP)," or the like, which are wireless network components or apparatus that serve and receive data, control, voice, video, sound, gaming, or data-streams or signaling-streams.

Base stations A 510, B 530, C 550, D 570 connect 5G user equipment (UE) to 5G CN (Core Network). The 5G CN is not shown in FIG. 5 (refer to FIG. 1). For simplicity, Base Stations A 510, B 530, C 550, D 570 as described herein with reference to FIG. 5 include Radio Units (RU), Distributed Units (DU), and Centralized Units (CU). A group of sectors, Sector 1 511, Sector 2 531, Sector 3 551, Sector 4 571 are shown to have fixed beam patterns with varying transmit powers. For example, Beam 3 576 in Sector 4 571 does not have the same range as Beam 4 578 in Sector 4 571. Transmit parameters, such as transmit power, azimuth, elevation and beamwidths (antenna configuration) are decided based on deployment constraints, such as presented by narrow streets, high-rise buildings, rural/urban scenarios, etc. The deployment constraints and associated transmit parameters are determined at the time of sector start.

Base Station A 510 is shown transmitting in Sector 1 511 using Beam 1 512, Beam 2 514, Beam 3 516, Beam 7 518, and Beam 8 520. Additional or fewer beams are capable of being transmitted by Base Station A 510. Base Station A 510 is also able to transmit using additional sectors to provide different coverage areas, for example to provide 360° of coverage.

Base Station B 530 is shown transmitting in Sector 2 531 using Beam 1 532, Beam 2 534, Beam 3 536, Beam 8 538, and Beam 9 540. Additional or fewer beams are capable of being transmitted by Base Station B 530. Base Station B 530 is also able to transmit using additional sectors to provide different coverage areas, for example to provide 360° of coverage.

Base Station C 550 is shown transmitting in Sector 3 551 using Beam 1 552, Beam 2 554, Beam 3 556, Beam 15 558, and Beam 16 560. Additional or fewer beams are capable of being transmitted by Base Station C 550. Base Station C 550 is also able to transmit using additional sectors to provide different coverage areas, for example to provide 360° of coverage.

Base Station D 570 is shown transmitting in Sector 4 571 using Beam 1 572, Beam 2 574, Beam 3 576, Beam 4 578, Beam 5 580, and Beam 6 582. Additional or fewer beams are capable of being transmitted by Base Station D 570. Base Station D 570 is also able to transmit using additional sectors to provide different coverage areas, for example to provide 360° of coverage.

First User Equipment, UE 1 590 is shown being serviced by Beam 1 512 of Sector 1 511 of Base Station A 510. UE 2 592 is shown being serviced by Beam 3 536 of Sector 2 531 of Base Station B 530. Base Stations A 510, B 530, C 550, D 570 have static directional beams that are fixed for a given deployment, or that change at a slow-time scale based on user density/traffic, etc. UE 1 590 and UE 2 592 are able to attach to base stations and roughly identify the beam angle using a SSB transmission.

However, as can be seen in FIG. 5, Beam 1 512 of Sector 1 511 that is transmitted by Base Station A 510 is impacted by interference from Beam 4 578 and Beam 5 580 that are transmitted by Base Station D 570 in Sector 4 571. Beam 1 512 of Sector 1 511 that is transmitted by Base Station A 510 is also impacted by interference from Beam 2 554 and Beam 3 556 that are transmitted by Base Station C 550 in Sector 3 551. Beam 2 514 of Sector 1 511 that is transmitted by Base Station A 510 is impacted by interference from Beam 1 552 and Beam 2 554 that are transmitted by Base Station C 550 in Sector 3 551. Beam 3 516 of Sector 1 511 that is transmitted by Base Station A 510 is impacted by interference from Beam 1 552 that is transmitted by Base Station C 550 in Sector 3 551, and by Beam 3 536 that is transmitted by Base Station B 550 in Sector 2 531.

The directional beams from Base Stations A 510, B 530, C 550, D 570 are used predominantly in mmWave (FR2) beamforming. However, those skilled in the art recognize that embodiments described herein are not meant to be limited FR2, and such embodiments are applicable for any directional beamforming deployment. Operators configure the beams based on the deployment scenario. For the beams, the neighboring beams which cause interference are able to be estimated from the beam patterns which are known a priori, and a geometrical overlap, as illustrated in FIG. 5, indicates mutual interference.

Information associated with beams from Base Stations A 510, B 530, C 550, and D 570 is able to be obtained by at a northbound platform, such as a RAN Intelligent Controller (RIC) and/or a Network Management System (NMS). For example, a RIC/NMS is able to obtain data such as boresight, GPS co-ordinates of antenna panels, azimuth and elevation tilt of antennas, Downlink (DL) transmit power, antenna configuration, pre-defined beams, etc. for the network, e.g., Base Stations A 510, B 530, C 550, and D 570.

An application, e.g., rApp, at the RIC/NMS is able to process this data to generate an interference matrix identifying interference patterns in the network. The interference matrix is able to be displayed and further processed to determine optimization solutions to improve Key Performance Indicators (KPIs) of a cell, including cell-edge throughput, sector throughput, to provide advanced load/balancing/optimization features, and to provide interference management, traffic steering, enhancement of spectral efficiency, etc. Based on the determined optimization solutions, one or more signals is sent to one or more elements in the O-RAN to implement the determined optimization solutions.

There are several optimization use cases applicable for massive MIMO systems in Frequency Range 1 (FR1) (4.1 GHz to 7.125 GHZ) and FR2 (24.25 GHz and 52.6 GHz). FR1 is for sub6 GHz bands and is also called low frequency bands. Bands in the millimeter wave range (FR2) have a shorter range, but have a higher available bandwidth than FRI bands. However, those skilled in the art recognize that embodiments described herein are not meant to be limited to these particular frequencies, and that other frequencies are able to be used. The mechanism for calculating the interference matrix is able to be extended to analog and digital beamforming deployments. The optimization features which would benefit from the knowledge of the interference matrix include interference management, load balancing, traffic steering, enhancement of spectral efficiency etc.

Figure 6:
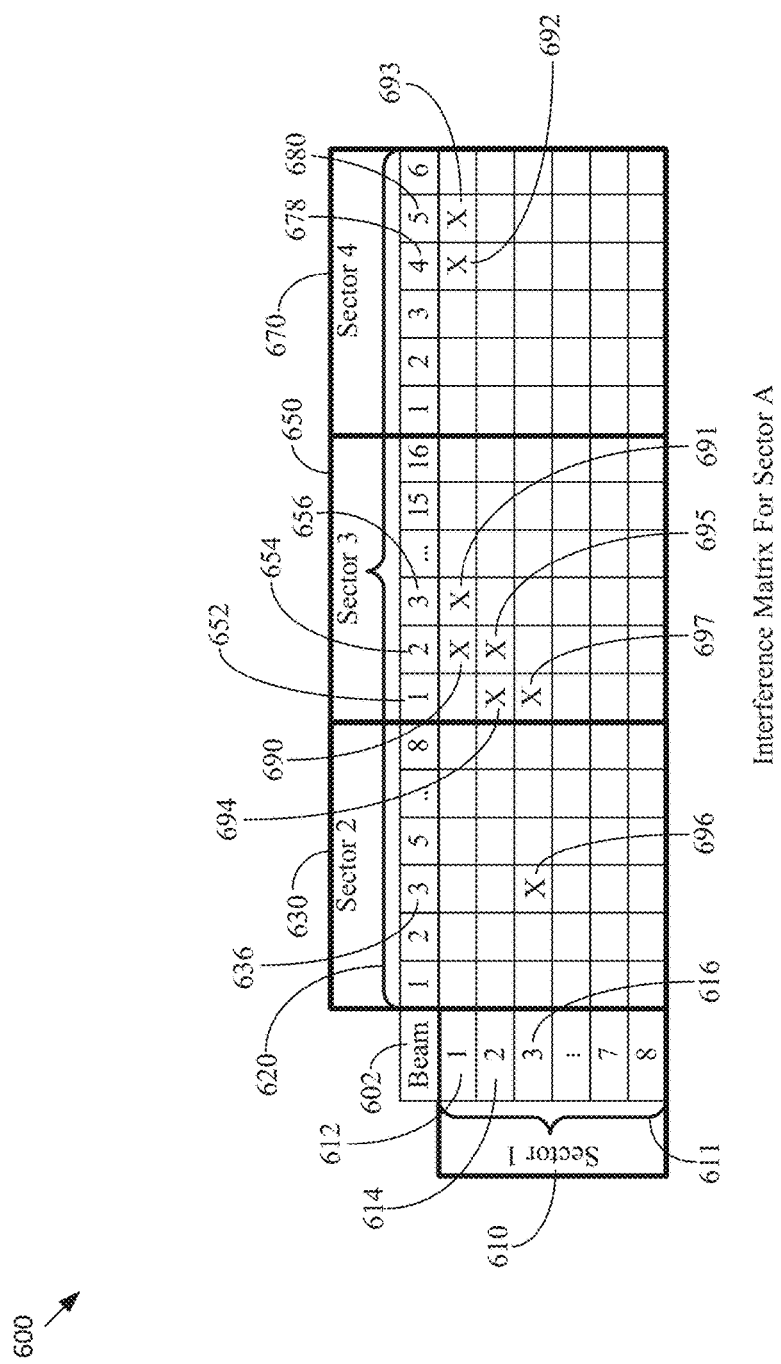
FIG. 6 is an interference matrix according to at least one embodiment.

FIG. 6 is an interference matrix 600 according to at least one embodiment.

In FIG. 6, Interference Matrix 600 is generated based on information about Beams 602 in the network, e.g., Sector 1 610, Sector 2, 630, Sector 3 650, and Sector 4 670. The Sectors 610, 630, 650, 670 and Beams 602 correspond to those illustrated in FIG. 5. Interference Matrix 600 is able to be presented on a display. Interference Matrix 600 shows interference patterns for Beams 602 in Sector 1 610, Sector 2 630, Sector 3 650, and Sector 4 670.

As shown in FIG. 6, the Interference Matrix 600 includes a grid matrix of interference indicators 690-697 for a first set of beams 611 in a sector of a first cell (Sector 1 610) displayed in M rows, and a second set of beams 620 in one or more sectors (Sector 2 630, Sector 3 650, Sector 4 670) of a second set of cells displayed in N columns. The one or more sectors (Sector 2 630, Sector 3 650, Sector 4 670) of the second set of cells are neighbors of the sector of a first cell (Sector 1 610).

Beam 1 612 in Sector 1 610 is impacted by interference from Beam 2 654 and Beam 3 656 of Sector 3 650, and Beam 4 678 and Beam 5 680 of Sector 4 670. In Interference Matrix 600, interference associated with Beam 1 612 in Sector 1 610 is represented with Interference Indicators "X" 690, 691 at the intersection of Beam 1 612 of Sector 1 610 with Beam 2 654 and Beam 3 656 of Sector 3 650, and with Interference Indicators "X" 692, 693 at the intersection of Beam 1 612 of Sector 1 610 with Beam 4 678 and Beam 5 680 of Sector 4 670.

Beam 2 614 in Sector 1 610 is impacted by interference from Beam 1 652 and Beam 2 654 of Sector 3 650. In Interference Matrix 600, interference associated with Beam 2 614 of Sector 1 610 is represented with Interference Indicators "X" 694, 695 at the intersection of Beam 2 614 of Sector 1 610 with Beam 1 652 and Beam 2 654 of Sector 3 650.

Beam 3 616 in Sector 1 610 is impacted by interference from Beam 3 636 of Sector 2 630 and Beam 1 652 of Sector 3 650. In Interference Matrix 600, interference associated with Beam 3 616 of Sector 1 610 is represented with Interference Indicator "X" 696 at the intersection of Beam 3 616 in Sector 1 610 with Beam 3 636 of Sector 2 630, and with Interference Indicator "X" 697 at the intersection of Beam 3 616 of Sector 1 610 with Beam 1 652 of Sector 3 650.

Information about Beams 602 from Sector 1 610, Sector 2 630, Sector 3 650, and Sector 4 670 is able to be obtained by at a northbound platform, such as a RAN Intelligent Controller (RIC) and/or a Network Management System (NMS). For example, a RIC/NMS is able to obtain data about Beams 602 such as boresight, GPS co-ordinates of antenna panels, azimuth and elevation tilt of antennas, Downlink (DL) transmit power, antenna configuration, pre-defined beams, etc. for the network, e.g., Sector 1 610, Sector 2 630, Sector 3 650, and Sector 4 670.

An application, e.g., rApp, at the RIC/NMS is able to process this data to generate Interference Matrix 600 to identify interference patterns in the network. Interference Matrix 600 is able to be displayed and further processed to implement optimization solutions. For example, optimization solutions are able to include providing load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between selected beams, improving KPIs of a cell, or improving cell-edge and sector throughput, etc. Different optimization features are able to utilize the beam interference table to increase efficacy. Examples of optimization solutions described herein are not meant to be limiting and those skilled in the art recognize other or different optimization techniques are able to be implemented.

Figure 7:
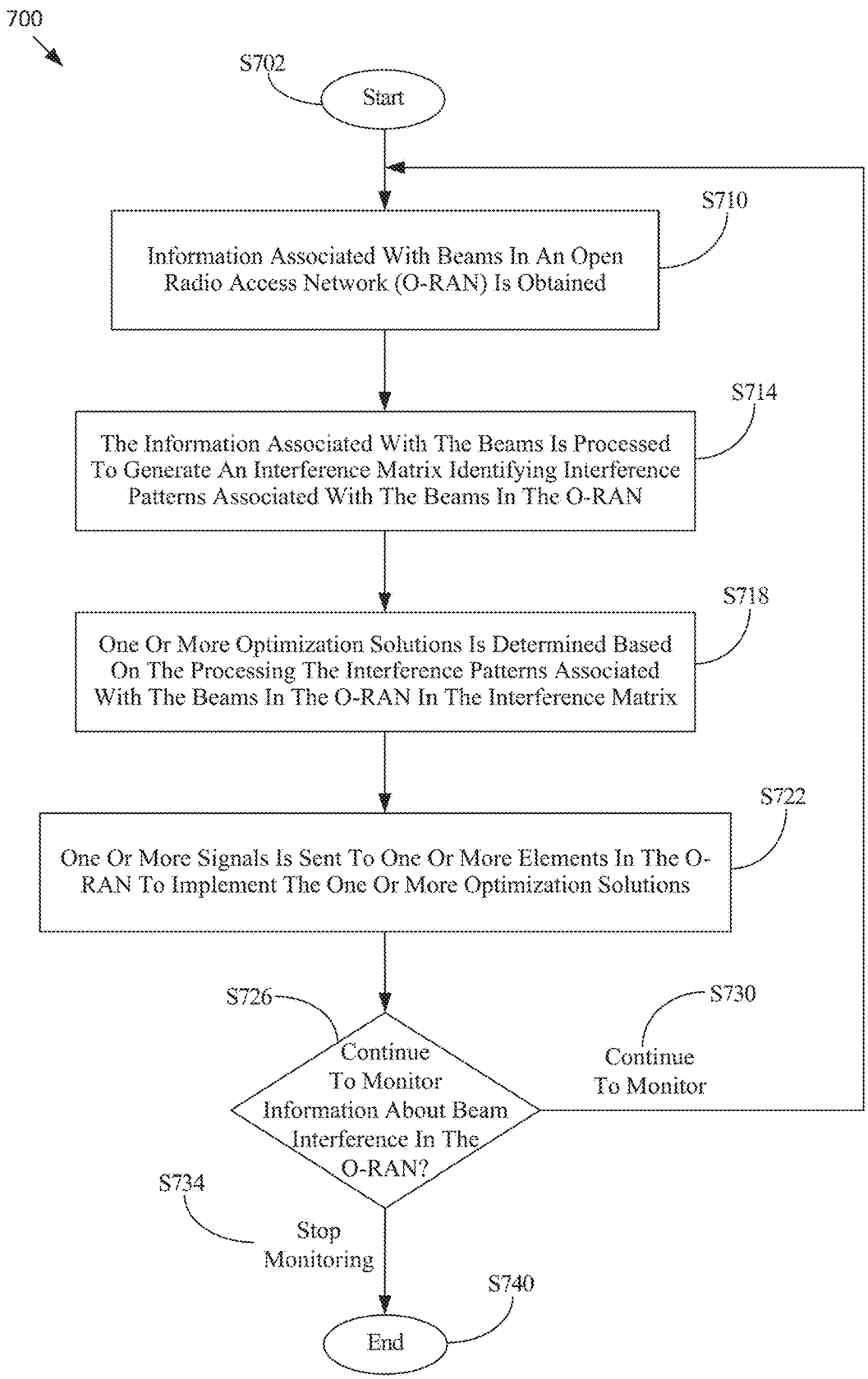
FIG. 7 is a is a flowchart of a method for identifying interference patterns and implementing interference optimizing solutions according to at least one embodiment.

FIG. 7 is a is a flowchart 700 of a method for identifying interference patterns and implementing interference optimizing solutions according to at least one embodiment.

In FIG. 7, the process starts S702 and information associated with beams in an Open Radio Access Network (O-RAN) is obtained S710. Referring to FIG. 5, information associated with beams from Base Stations A 510, B 530, C 550, and D 570 is able to be obtained by at a northbound platform, such as a RAN Intelligent Controller (RIC) and/or a Network Management System (NMS). For example, a RIC/NMS is able to obtain data such as boresight, GPS co-ordinates of antenna panels, azimuth and elevation tilt of antennas, Downlink (DL) transmit power, antenna configuration, pre-defined beams, etc. for the network, e.g., Base Stations A 510, B 530, C 550, and D 570.

The information associated with the beams is processed to generate an interference matrix identifying interference patters associated with the beams in the O-RAN S714. Referring to FIG. 6, Interference Matrix 600 is generated based on information about Beams 602 in the network, e.g., Sector 1 610, Sector 2, 630, Sector 3 650, and Sector 4 670. The Sectors 610, 630, 650, 670 and Beams 602 correspond to those illustrated in FIG. 5. Interference Matrix 600 is able to be presented on a display. Interference Matrix 600 shows interference patterns for Beams 602 in Sector 1 610, Sector 2 630, Sector 3 650, and Sector 4 670. As shown in FIG. 6, the Interference Matrix 600 includes a grid matrix of interference indicators 690-697 for a first set of beams 611 in a sector of a first cell (Sector 1 610) displayed in M rows, and a second set of beams 620 in one or more sectors (Sector 2 630, Sector 3 650, Sector 4 670) of a second set of cells displayed in N columns. The one or more sectors (Sector 2 630, Sector 3 650, Sector 4 670) of the second set of cells are neighbors of the sector of a first cell (Sector 1 610). Beam 1 612 in Sector 1 610 is impacted by interference from Beam 2 654 and Beam 3 656 of Sector 3 650, and Beam 4 678 and Beam 5 680 of Sector 4. In Interference Matrix 600, interference associated with Beam 1 612 in Sector 1 610 is represented with Interference Indicators "X" 690, 691 at the intersection of Beam 1 612 of Sector 1 610 with Beam 2 654 and Beam 3 656 of Sector 3 650, and with Interference Indicators "X" 692, 693 at the intersection of Beam 1 612 of Sector 1 610 with Beam 4 678 and Beam 5 680 of Sector 4 670. Beam 2 614 in Sector 1 610 is impacted by interference from Beam 1 652 and Beam 2 654 of Sector 3 650. In Interference Matrix 600, interference associated with Beam 2 614 of Sector 1 610 is represented with Interference Indicators "X" 694, 695 at the intersection of Beam 2 614 of Sector 1 610 with Beam 1 652 and Beam 2 654 of Sector 3 650. Beam 3 616 in Sector 1 610 is impacted by interference from Beam 3 636 of Sector 2 630 and Beam 1 652 of Sector 3 650. In Interference Matrix 600, interference associated with Beam 3 616 of Sector 1 610 is represented with Interference Indicator "X" 696 at the intersection of Beam 3 616 in Sector 1 610 with Beam 3 636 of Sector 2 630, and with Interference Indicator "X" 697 at the intersection of Beam 3 616 of Sector 1 610 with Beam 1 652 of Sector 3 650.

One or more optimization solutions are determined based on the processing of the interference patterns associated with the beams in the O-RAN in the interference matrix S718. Referring to FIG. 6, Interference Matrix 600 is able to be displayed and further processed to implement optimization solutions. For example, optimization solutions are able to include providing load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between selected beams, improving Key Performance Indicators (KPIs) of a cell, or improving cell-edge and sector throughput, etc. Different optimization features are able to utilize the beam interference table to increase efficacy. Examples of optimization solutions described herein are not meant to be limiting and those skilled in the art recognize other or different optimization techniques are able to be implemented.

One or more signals is sent to one or more elements in the O-RAN to implement the one or more optimization solutions S722. Referring to FIG. 5, based on the determined optimization solutions, one or more signals is sent to one or more elements in the O-RAN to implement the determined optimization solutions.

A determination if made whether to continue monitoring information about beam interference in the O-RAN S726.

In response to determining to continue monitoring information about beam interference in the O-RAN S730, the process returns to obtain information associated with beams in the O-RAN S710.

In response to determining not to continue monitoring information about beam interference in the O-RAN S734, the process then terminates S740.

Figure 8:
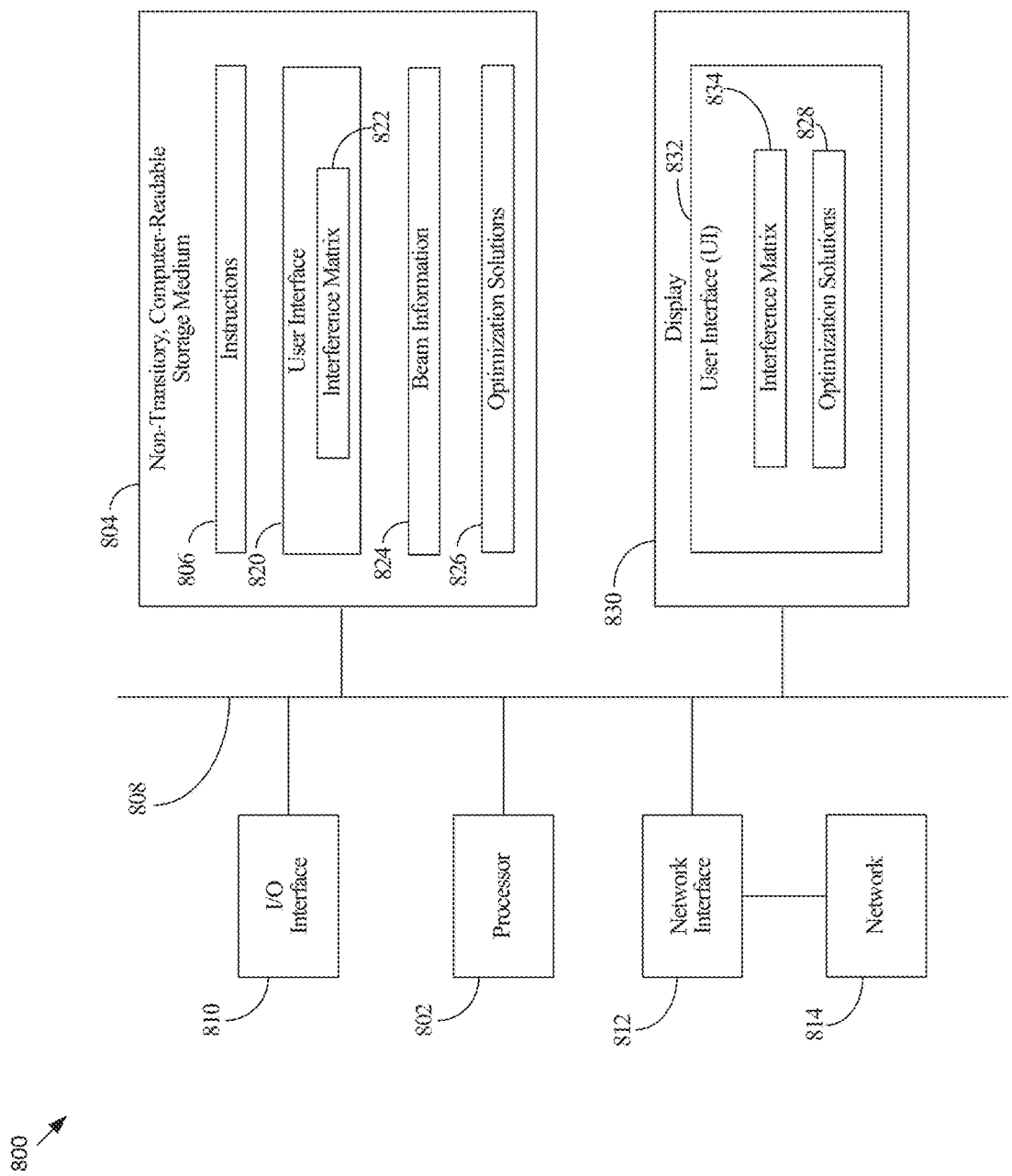
FIG. 8 is a high-level functional block diagram of a processor-based system according to at least one embodiment.

FIG. 8 is a high-level functional block diagram of a processor-based system 800 according to at least one embodiment.

In at least one embodiment, processing circuitry 800 models interference patterns in a massive Multiple Input Multiple Output (MIMO) deployment. Processing circuitry 800 implements models interference patterns in a massive Multiple Input Multiple Output (MIMO) deployment using Processor 802. Processing circuitry 800 also includes a Non-Transitory, Computer-Readable Storage Medium 804 that is used to model interference patterns in a massive Multiple Input Multiple Output (MIMO) deployment. Non-Transitory, Computer-Readable Storage Medium 804, amongst other things, is encoded with, i.e., stores, Instructions 806, i.e., computer program code, that are executed by Processor 802 causes Processor 802 to perform operations for modeling interference patterns in a massive Multiple Input Multiple Output (MIMO) deployment. Execution of Instructions 806 by Processor 802 represents (at least in part) an application which implements at least a portion of the methods described herein in accordance with one or more embodiments (hereinafter, the noted processes and/or methods).

Processor 802 is electrically coupled to Non-Transitory, Computer-Readable Storage Medium 804 via a Bus 808. Processor 802 is electrically coupled to an Input/Output (I/O) Interface 810 by Bus 808. A Network Interface 812 is also electrically connected to Processor 802 via Bus 808. Network Interface 812 is connected to a Network 814, so that Processor 802 and Non-Transitory, Computer-Readable Storage Medium 804 connect to external elements via Network 814. Processor 802 is configured to execute Instructions 806 encoded in Non-Transitory, Computer-Readable Storage Medium 804 to cause processing circuitry 800 to be usable for performing at least a portion of the processes and/or methods. In one or more embodiments, Processor 802 is a Central Processing Unit (CPU), a multiprocessor, a distributed processing system, an Application Specific Integrated Circuit (ASIC), and/or a suitable processing unit.

Processing circuitry 800 includes I/O Interface 810. I/O interface 810 is coupled to external circuitry. In one or more embodiments, I/O Interface 810 includes a keyboard, keypad, mouse, trackball, trackpad, touchscreen, and/or cursor direction keys for communicating information and commands to Processor 802.

Processing circuitry 800 also includes Network Interface 812 coupled to Processor 802. Network Interface 812 allows processing circuitry 800 to communicate with Network 814, to which one or more other computer systems are connected. Network Interface 812 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 800 is configured to receive information through I/O Interface 810. The information received through I/O Interface 810 includes one or more of instructions, data, design rules, libraries of cells, and/or other parameters for processing by Processor 802. The information is transferred to Processor 802 via Bus 808. Processing circuitry 800 is configured to receive information related to a User Interface (UI) 822 through I/O Interface 810. The information is stored in Non-Transitory, Computer-Readable Storage Medium 804 as UI 820.

In one or more embodiments, one or more Non-Transitory, Computer-Readable Storage Medium 804 having stored thereon Instructions 806 (in compressed or uncompressed form) that may be used to program a computer, processor, or other electronic device) to perform processes or methods described herein. The one or more Non-Transitory, Computer-Readable Storage Medium 804 include one or more of an electronic storage medium, a magnetic storage medium, an optical storage medium, a quantum storage medium, or the like.

For example, the Non-Transitory, Computer-Readable Storage Medium 804 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 804 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 804 stores Instructions 806 configured to cause Processor 802 to perform at least a portion of the processes and/or methods for modeling interference patterns in a massive Multiple Input Multiple Output (MIMO) deployment. In one or more embodiments, Non-Transitory, Computer-Readable Storage Medium 804 also stores information, such as algorithm which facilitates performing at least a portion of the processes and/or methods for modeling interference patterns in a massive Multiple Input Multiple Output (MIMO) deployment.

Accordingly, in at least one embodiment, Processor 802 executes Instructions 806 stored on the one or more Non-Transitory, Computer-Readable Storage Medium 804 to model interference patterns in a massive Multiple Input Multiple Output (MIMO) deployment. Processor 802 obtains information associated with beams from base stations in a network, such as an Open Radio Access Network (O-RAN). For example, Processor 802 is able to obtain data such as boresight, GPS co-ordinates of antenna panels, azimuth and elevation tilt of antennas, Downlink (DL) transmit power, antenna configuration, pre-defined beams, etc. for the Network via Network Interface 812. Processor 802 stores Beam Information 824 in one or more Non-Transitory, Computer-Readable Storage Medium 804. Processor 802 analyzes the Beam Information 824 to generate an Interference Matrix 822 identifying interference patterns based on the information associated with the beams transmitted in the Network 814. The Interference Matrix 822 is retrieved from Non-Transitory, Computer-Readable Storage Medium 804 where Interference Matrix 834 is presented in UI 832 on Display 830. Interference Matrix 834 is able to be represented by a grid matrix of interference indicators for a first set of beams in a sector of a first cell displayed in M rows and a second set of beams in one or more sectors of a second set of cells displayed in N columns, wherein the interference indicators are aligned at the intersection of a beam in a first sector of a cell and a beam of a second sectors of a cell. The interference indicators represent interference impacting a beam in a first sector of a cell by a beam of a second sector of a cell. Processor 802 analyzes Interference Matrix 822 to determine Optimization Solutions 826 based on interference patterns identified in the Interference Matrix 834. For example, the Optimization Solutions 826 include at least one of load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between selected beams, improving Key Performance Indicators (KPIs) of a cell, or improving cell-edge and sector throughput. The Optimization Solutions 822 are able to be presented as Optimization Solutions 838 in UI 832 on Display 830. Based on the determined Optimization Solutions 826, one or more signals is sent to one or more elements in Network 814 via Network Interface 812 to implement the determined Optimization Solutions 826.

Embodiments described herein provide a method that provides one or more advantages. For example, the Interference Matrix 822 enables solutions to be deployed to improve KPIs of a cell, including cell-edge throughput, sector throughput etc. The Interference Matrix 822 is also able to be used for advanced load optimization features.

In a method according to at least one embodiment, a method for modeling interference patterns in a Massive Multiple Input, Multiple Output (MIMO) network includes obtaining, at a Radio Access Network (RAN) Intelligent Controller (RIC), information associated with at least two beams transmitted in an Open RAN (O-RAN), generating, at the RIC, an interference matrix identifying interference patterns based on the information associated with the at least two beams transmitted in the O-RAN, determining, by the RIC, one or more optimization solutions based on the interference patterns identified in the interference matrix, and sending, by the RIC, one or more signals to one or more elements in the O-RAN to implement the one or more optimization solutions.

In a method according to at least one embodiment, the generating the interference matrix identifying interference patterns based on the information associated with the at least two beams transmitted in the O-RAN further includes generating a grid matrix of interference indicators for a first set of beams in a sector of a first cell displayed in rows and a second set of beams in one or more sectors of a second set of cells displayed in columns.

In a method according to at least one embodiment, the generating the grid matrix of the interference indicators for the first set of beams in the sector of the first cell displayed in rows and the second set of beams in the one or more sectors of the second set of cells displayed in columns includes aligning a first of the interference indicators at an intersection of a first beam of the first set of beams in the sector of the first cell and a second beam of the second set of beams in one of the one or more sectors of a second cell in the second set of cells, wherein the first of the interference indicators represents the first beam being impacted by the second beam.

In a method according to at least one embodiment, the generating the interference matrix identifying interference patterns based on the information associated with the at least two beams transmitted in the O-RAN further includes generating a grid matrix having interference indicators presented in an M rows x N columns grid, wherein the M rows represent at least one beam in at least a sector of a first cell, and the N columns represent at least one beam in a sector of one or more neighbor cells of the first cell.

In a method according to at least one embodiment, the generating the grid matrix having the interference indicators presented in the M rows x N columns grid includes aligning a one of the interference indicators in a first of the M rows representing a first beam of the sector of the first cell and in a first of the N columns representing a second beam of a second of a one of the one or more neighbor cells, the interference indicator representing the first beam being impacted by interference from the second beam.

In a method according to at least one embodiment, the determining the one or more optimization solutions based on the interference patterns identified in the interference matrix includes determining at least one of load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between the at least two beams, improving Key Performance Indicators (KPIs) of a cell, or improving cell-edge and sector throughput.

In a method according to at least one embodiment, the generating the interference matrix identifying interference patterns based on the information associated with the at least two beams transmitted in the O-RAN further includes presenting the interference matrix on a display.

In at least one embodiment, a Radio Access Network (RAN) Intelligent Controller (RIC) includes a memory storing computer-readable instructions, and a processor connected to the memory, wherein the processor is configured to execute the computer-readable instructions to obtain information associated with at least two beams transmitted in an Open RAN (O-RAN), generate an interference matrix identifying interference patterns based on the information associated with the at least two beams transmitted in the O-RAN, determining one or more optimization solutions based on the interference patterns identified in the interference matrix, and sending one or more signals to one or more elements in the O-RAN to implement the one or more optimization solutions.

In a RIC according to at least one embodiment, the processor is further configured to generate the interference matrix identifying interference patterns based on the information associated with the at least two beams transmitted in the O-RAN by generating a grid matrix of interference indicators for a first set of beams in a sector of a first cell displayed in rows and a second set of beams in one or more sectors of a second set of cells displayed in columns.

In a RIC according to at least one embodiment, the processor is further configured to generate the grid matrix of the interference indicators for the first set of beams in the sector of the first cell displayed in rows and the second set of beams in the one or more sectors of the second set of cells displayed in columns by aligning a first of the interference indicators at an intersection of a first beam of the first set of beams in the sector of the first cell and a second beam of the second set of beams in one of the one or more sectors of a second cell in the second set of cells, wherein the first of the interference indicators represents the first beam being impacted by the second beam.

In a RIC according to at least one embodiment, the processor is further configured to generate the interference matrix identifying interference patterns based on the information associated with the at least two beams transmitted in the O-RAN further by generating a grid matrix having interference indicators presented in an M rows x N columns grid, wherein the M rows represent at least one beam in at least a sector of a first cell, and the N columns represent at least one beam in a sector of one or more neighbor cells of the first cell In a RIC according to at least one embodiment, the processor is further configured to generate the grid matrix having the interference indicators presented in the M rows x N columns grid by aligning a one of the interference indicators aligned in a first of the M rows representing a first beam of the sector of the first cell and in a first of the N columns representing a second beam of a second of a one of the one or more neighbor cells, the interference indicator representing the first beam being impacted by interference from the second beam.

In a RIC according to at least one embodiment, the one or more optimization solutions includes at least one of load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between the at least two beams, improving Key Performance Indicators (KPIs) of a cell, or improving cell-edge and sector throughput.

In a RIC according to at least one embodiment, the processor is further configured to present the interference matrix on a display.

In at least one embodiment, a non-transitory computer-readable media having computer-readable instructions stored thereon, which when executed by a processor causes the processor to perform operations including obtaining, at a Radio Access Network (RAN) Intelligent Controller (RIC), information associated with at least two beams transmitted in an Open RAN (O-RAN), generating, at the RIC, an interference matrix identifying interference patterns based on the information associated with the at least two beams transmitted in the O-RAN, determining, by the RIC, one or more optimization solutions based on the interference patterns identified in the interference matrix, and sending, by the RIC, one or more signals to one or more elements in the O-RAN to implement the one or more optimization solutions.

In a non-transitory computer-readable media according to at least one embodiment, the generating the interference matrix identifying interference patterns based on the information associated with the at least two beams transmitted in the O-RAN further includes generating a grid matrix of interference indicators for a first set of beams in a sector of a first cell displayed in rows and a second set of beams in one or more sectors of a second set of cells displayed in columns.

In a non-transitory computer-readable media according to at least one embodiment, the generating the grid matrix of the interference indicators for the first set of beams in the sector of the first cell displayed in rows and the second set of beams in the one or more sectors of the second set of cells displayed in columns includes aligning a first of the interference indicators at an intersection of a first beam of the first set of beams in the sector of the first cell and a second beam of the second set of beams in one of the one or more sectors of a second cell in the second set of cells, wherein the first of the interference indicators represents the first beam being impacted by the second beam.

In a non-transitory computer-readable media according to at least one embodiment, the generating the interference matrix identifying interference patterns based on the information associated with the at least two beams transmitted in the O-RAN further includes generating a grid matrix having interference indicators presented in an M rows x N columns grid, wherein the M rows represent at least one beam in at least a sector of a first cell, and the N columns represent at least one beam in a sector of one or more neighbor cells of the first cell, and aligning a one of the interference indicators aligned in a first of the M rows representing a first beam of the sector of the first cell and in a first of the N columns representing a second beam of a second of a one of the one or more neighbor cells, the interference indicator representing the first beam being impacted by interference from the second beam.

In a non-transitory computer-readable media according to at least one embodiment, the determining the one or more optimization solutions based on the interference patterns identified in the interference matrix includes determining at least one of load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between the at least two beams, improving Key Performance Indicators (KPIs) of a cell, or improving cell-edge and sector throughput.

In a non-transitory computer-readable media according to at least one embodiment, the generating the interference matrix identifying interference patterns based on the information associated with the at least two beams transmitted in the O-RAN further includes presenting the interference matrix on a display.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for modeling interference patterns in a Massive Multiple Input, Multiple Output (MIMO) network, comprising:
    obtaining, at a Radio Access Network (RAN) Intelligent Controller (RIC), information associated with at least two beams transmitted in an Open RAN (O-RAN);
    generating, at the RIC, an interference matrix identifying interference patterns based on the information associated with the at least two beams transmitted in the O-RAN;
    determining, by the RIC, one or more optimization solutions based on the interference patterns identified in the interference matrix; and
    sending, by the RIC, one or more signals to one or more elements in the O-RAN to implement the one or more optimization solutions.

2. The method of claim 1, wherein the generating the interference matrix identifying interference patterns based on the information associated with the at least two beams transmitted in the O-RAN further includes generating a grid matrix of interference indicators for a first set of beams in a sector of a first cell displayed in rows and a second set of beams in one or more sectors of a second set of cells displayed in columns.

3. The method of claim 2, wherein the generating the grid matrix of the interference indicators for the first set of beams in the sector of the first cell displayed in rows and the second set of beams in the one or more sectors of the second set of cells displayed in columns includes aligning a first of the interference indicators at an intersection of a first beam of the first set of beams in the sector of the first cell and a second beam of the second set of beams in one of the one or more sectors of a second cell in the second set of cells, wherein the first of the interference indicators represents the first beam being impacted by the second beam.

4. The method of claim 1, wherein the generating the interference matrix identifying interference patterns based on the information associated with the at least two beams transmitted in the O-RAN further includes generating a grid matrix having interference indicators presented in an M rows×N columns grid, wherein the M rows represent at least one beam in at least a sector of a first cell, and the N columns represent at least one beam in a sector of one or more neighbor cells of the first cell.

5. The method of claim 4, wherein the generating the grid matrix having the interference indicators presented in the M rows×N columns grid includes aligning a one of the interference indicators in a first of the M rows representing a first beam of the sector of the first cell and in a first of the N columns representing a second beam of a second of a one of the one or more neighbor cells, the interference indicator representing the first beam being impacted by interference from the second beam.

6. The method of claim 1, wherein the determining the one or more optimization solutions based on the interference patterns identified in the interference matrix includes determining at least one of load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between the at least two beams, improving Key Performance Indicators (KPIs) of a cell, or improving cell-edge and sector throughput.

7. The method of claim 1, wherein the generating the interference matrix identifying interference patterns based on the information associated with the at least two beams transmitted in the O-RAN further includes presenting the interference matrix on a display.

8. A Radio Access Network (RAN) Intelligent Controller (RIC), comprising:
    a memory storing computer-readable instructions; and
    a processor connected to the memory, wherein the processor is configured to execute the computer-readable instructions to:
        obtain information associated with at least two beams transmitted in an Open RAN (O-RAN);
        generate an interference matrix identifying interference patterns based on the information associated with the at least two beams transmitted in the O-RAN;
        determining one or more optimization solutions based on the interference patterns identified in the interference matrix; and
        sending one or more signals to one or more elements in the O-RAN to implement the one or more optimization solutions.

9. The RIC of claim 8, wherein the processor is further configured to generate the interference matrix identifying interference patterns based on the information associated with the at least two beams transmitted in the O-RAN by generating a grid matrix of interference indicators for a first set of beams in a sector of a first cell displayed in rows and a second set of beams in one or more sectors of a second set of cells displayed in columns.

10. The RIC of claim 9, wherein the processor is further configured to generate the grid matrix of the interference indicators for the first set of beams in the sector of the first cell displayed in rows and the second set of beams in the one or more sectors of the second set of cells displayed in columns by aligning a first of the interference indicators at an intersection of a first beam of the first set of beams in the sector of the first cell and a second beam of the second set of beams in one of the one or more sectors of a second cell in the second set of cells, wherein the first of the interference indicators represents the first beam being impacted by the second beam.

11. The RIC of claim 8, wherein the processor is further configured to generate the interference matrix identifying interference patterns based on the information associated with the at least two beams transmitted in the O-RAN further by generating a grid matrix having interference indicators presented in an M rows×N columns grid, wherein the M rows represent at least one beam in at least a sector of a first cell, and the N columns represent at least one beam in a sector of one or more neighbor cells of the first cell.

12. The RIC of claim 11, wherein the processor is further configured to generate the grid matrix having the interference indicators presented in the M rows×N columns grid by aligning a one of the interference indicators aligned in a first of the M rows representing a first beam of the sector of the first cell and in a first of the N columns representing a second beam of a second of a one of the one or more neighbor cells, the interference indicator representing the first beam being impacted by interference from the second beam.

13. The RIC of claim 8, wherein the one or more optimization solutions includes at least one of load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between the at least two beams, improving Key Performance Indicators (KPIs) of a cell, or improving cell-edge and sector throughput.

14. The RIC of claim 8, wherein the processor is further configured to present the interference matrix on a display.

15. A non-transitory computer-readable media having computer-readable instructions stored thereon, which when executed by a processor causes the processor to perform operations comprising:
    obtaining, at a Radio Access Network (RAN) Intelligent Controller (RIC), information associated with at least two beams transmitted in an Open RAN (O-RAN);
    generating, at the RIC, an interference matrix identifying interference patterns based on the information associated with the at least two beams transmitted in the O-RAN;
    determining, by the RIC, one or more optimization solutions based on the interference patterns identified in the interference matrix; and
    sending, by the RIC, one or more signals to one or more elements in the O-RAN to implement the one or more optimization solutions.

16. The non-transitory computer-readable media of claim 15, wherein the generating the interference matrix identifying interference patterns based on the information associated with the at least two beams transmitted in the O-RAN further includes generating a grid matrix of interference indicators for a first set of beams in a sector of a first cell displayed in rows and a second set of beams in one or more sectors of a second set of cells displayed in columns.

17. The non-transitory computer-readable media of claim 16, wherein the generating the grid matrix of the interference indicators for the first set of beams in the sector of the first cell displayed in rows and the second set of beams in the one or more sectors of the second set of cells displayed in columns includes aligning a first of the interference indicators at an intersection of a first beam of the first set of beams in the sector of the first cell and a second beam of the second set of beams in one of the one or more sectors of a second cell in the second set of cells, wherein the first of the interference indicators represents the first beam being impacted by the second beam.

18. The non-transitory computer-readable media of claim 15, wherein the generating the interference matrix identifying interference patterns based on the information associated with the at least two beams transmitted in the O-RAN further includes generating a grid matrix having interference indicators presented in an M rows×N columns grid, wherein the M rows represent at least one beam in at least a sector of a first cell, and the N columns represent at least one beam in a sector of one or more neighbor cells of the first cell, and aligning a one of the interference indicators aligned in a first of the M rows representing a first beam of the sector of the first cell and in a first of the N columns representing a second beam of a second of a one of the one or more neighbor cells, the interference indicator representing the first beam being impacted by interference from the second beam.

19. The non-transitory computer-readable media of claim 15, wherein the determining the one or more optimization solutions based on the interference patterns identified in the interference matrix includes determining at least one of load balancing traffic during enhancement of spectral efficiency, minimizing interference and otherwise managing interference, adjusting traffic steering, enhancing spectral efficiency, reducing a direction of power or not transmitting on a selected beam, reducing a normalized carrier separation between the at least two beams, improving Key Performance Indicators (KPIs) of a cell, or improving cell-edge and sector throughput.

20. The non-transitory computer-readable media of claim 15, wherein the generating the interference matrix identifying interference patterns based on the information associated with the at least two beams transmitted in the O-RAN further includes presenting the interference matrix on a display.

* * * * *